United States Patent
Koyama et al.

(10) Patent No.: US 7,056,030 B2
(45) Date of Patent: Jun. 6, 2006

(54) PIVOT BEARING FOR A SWING ARM OF A HARD DISK DRIVE DEVICE

(75) Inventors: Toshisada Koyama, Miyota-machi (JP); Yasuhiro Mouri, Miyota-machi (JP)

(73) Assignee: Minebea Kabushiki-Kaisha, Nagano-ken (JP)

( * ) Notice: Subject to any disclaimer, the term of this patent is extended or adjusted under 35 U.S.C. 154(b) by 0 days.

(21) Appl. No.: 10/228,183

(22) Filed: Aug. 27, 2002

(65) Prior Publication Data

US 2003/0044096 A1   Mar. 6, 2003

(30) Foreign Application Priority Data

Aug. 31, 2001  (JP) .............................. 2001-262984

(51) Int. Cl.
*F16C 19/10* (2006.01)
(52) U.S. Cl. ...................................... 384/613
(58) Field of Classification Search ................ 384/613, 384/611, 517, 563, 512
See application file for complete search history.

(56) References Cited

U.S. PATENT DOCUMENTS 6,050,728 A * 4/2000 Obara et al. ................. 384/512
6,050,729 A * 4/2000 Obara et al. ................. 384/613

* cited by examiner

*Primary Examiner*—Leonard A. Footland
(74) *Attorney, Agent, or Firm*—Israel Gopstein

(57) ABSTRACT

A pivot bearing includes a stepped shaft having an enlarged diameter shaft portion and a reduced diameter shaft portion; a plurality of balls of a lower row are interposed between the enlarged diameter shaft portion and a sleeve outer ring surrounding the enlarged diameter shaft portion; a ball bearing including inner and outer rings and a plurality of balls interposed therebetween is provided around the reduced diameter shaft portion so that the inner ring is secured around the reduced diameter shaft portion while applying an appropriate pre-load on the upper end surface of the inner ring, and the outer ring is urged to contact the lower surface thereof intimately onto the upper surface of the sleeve outer ring. The pivot bearing has a reduced number of parts, is facilitated in incorporation into a swing arm, and is expected to be manufactured at a reduced cost.

6 Claims, 4 Drawing Sheets

PIVOT BEARING FOR A SWING ARM OF A HARD DISK DRIVE DEVICE

BACKGROUND OF THE INVENTION

1. Technical Field

The present invention relates to a pivot bearing for a swing arm for swingably supporting a magnetic head in a hard disk drive device.

2. Description of the Prior Art

A hard disk drive device of a larger capacity is required, so that the density of the tracks on the magnetic disk, i.e. the storage medium, is increased accordingly. On the other hand, however, there is strong demand for reduction of the cost of manufacturing the same.

It is, therefore, necessary to reduce the cost for manufacturing, to enhance the accuracy of rotation of the magnetic disk, to control precisely the position of the magnetic head for writing data onto the magnetic disk and/or reading therefrom. In this connection, a swing arm for supporting the magnetic head must have a structure which can be pivoted with high precision, in order to displace the magnetic head accurately.

In other words, a pivot bearing of high precision in its rotation must be used for rotatable support of the swing arm. Further, it is necessary to facilitate the operation for mounting the swing arm to the pivot bearing and the operation for mounting the pivot bearing to the hard disk drive device to reduce the number of operations required therefor and to reduce the cost of manufacturing the same.

One of the swing arm supporting structures of the prior art is illustrated in FIG. 6. In FIG. 6, reference numeral 31 is given to a base of the hard disk drive device, reference numeral 32 is given to a shaft extending vertically from the base. The structure further includes a pair of upper and lower ball bearings 33 and 34, the inner rings of which are mounted around the outer periphery of the shaft 32, and a cylindrical bearing holder 35 mounted around the outer rings of the ball bearings. A swing arm 36 is adapted to be fit around the outer periphery of the bearing holder 35 by fitting a vertical through hole 37a extending through a cylindrical fitting portion 37 formed on the base of the arm. The swing arm 36 is secured to the bearing holder 35 by any means such as an adhesion.

In the swing arm assembly of the prior art as described above, the precision required in processing and assembling the bearing holder 35 to be interposed between the ball bearings 33, 34 and the fitting cylinder 37 of the swing arm is substantially the same level as that required for processing and assembling the upper and lower ball bearings.

Thus the number of parts of the swing arm assembly of the prior art is relatively large. Control of the precision of these parts is difficult. These are the difficulties encountered in reducing the cost for manufacturing the hard disk drive device.

OBJECT OF THE INVENTION

It is, therefore, the object of the present invention to provide a pivot bearing for a swing arm which is enhanced in precision of its rotation, reduced in the number of parts included therein, facilitated in incorporation thereof into the hard disk drive device, and reduced in the cost of manufacture thereof.

SUMMARY OF THE INVENTION

In order to attain the above-mentioned object, a pivot bearing is provided for the swing arm of a hard disk drive device, the pivot bearing being characterized in that it comprises:

- a stepped shaft including an enlarged diameter shaft portion and a reduced diameter shaft portion wherein, directly around the outer periphery thereof, the enlarged diameter shaft portion is provided with an inner ring raceway for a lower row;
- a sleeve outer ring surrounding the enlarged diameter shaft portion of the stepped shaft wherein, directly around the inner periphery thereof, the sleeve outer ring is provided with an outer ring raceway;
- a plurality of balls of the lower row adapted to be interposed between the inner and outer ring raceways; and
- a hall bearing including inner and outer rings and a plurality of balls interposed therebetween, wherein the inner ring is secured around the reduced diameter shaft portion while applying an appropriate amount of preload on the upper end surface of the inner ring, and the lower surface of the outer ring is urged onto the upper surface of the sleeve outer ring to contact intimately therewith.

In the pivot bearing of the present invention, the end surface of the outer ring of the ball bearing and the corresponding opposite end surface of the sleeve outer ring are ground with high precision on their flatness and perpendicularity so as not to produce wave-shaped deformations thereon, and thus obtained parts can be assembled so as to contact intimately with each other.

The pivot bearing of the present invention includes:

- a stepped shaft including an enlarged diameter shaft portion and a reduced diameter shaft portion wherein, directly around the outer periphery thereof, the enlarged diameter shaft portion is provided with an inner ring raceway for a lower row;
- a sleeve outer ring surrounding the enlarged diameter shaft portion of the stepped shaft wherein, directly around the inner periphery thereof, the sleeve outer ring is provided with an outer ring raceway;
- a plurality of balls of the lower row adapted to be interposed between the inner and outer ring raceways; and
- a ball bearing including inner and outer rings and a plurality of balls interposed therebetween, wherein the inner ring is secured around the reduced diameter shaft portion while applying an appropriate amount of preload on the upper end surface of the inner ring, and the lower surface of the outer ring is urged onto the upper surface of the sleeve outer ring to contact intimately therewith, and wherein the outer diameter of the outer ring of the ball bearing is the same as the outer diameter of the sleeve outer ring.

In the pivot bearing of the present invention, the end surface of the outer ring of the ball bearing and the corresponding opposite end surface of the sleeve outer ring are ground with high precision on their flatness and perpendicularity so as not to produce wave-shaped deformations thereon, and thus obtained parts can be assembled so as to contact intimately with each other.

In the pivot bearing of the present invention, the outer surface of the outer ring of the ball bearing and the outer surface of the sleeve outer ring define a straight outer peripheral surface around which the swing arm is mounted directly.

In the pivot bearing of the present invention, the end surface of the outer ring of the ball bearing and the corresponding opposite end surface of the sleeve outer ring are ground with high precision on their flatness and perpendicularity so as not to produce wave-shaped deformations thereon, and thus obtained elements can be assembled so as to contact intimately with each other.

A pivot bearing of the present invention comprises:
- a stepped shaft including an enlarged diameter shaft portion and a reduced diameter shaft portion wherein, directly around the outer periphery thereof, the enlarged diameter shaft portion is provided with an inner ring raceway for the lower row;
- a sleeve outer ring surrounding the enlarged diameter shaft portion of the stepped shaft wherein, directly around the inner periphery thereof, the sleeve outer ring is provided with an outer ring raceway;
- a plurality of balls of the lower row adapted to be interposed between the inner and outer ring raceways; and
- a ball bearing including inner and outer rings and a plurality of balls interposed therebetween, wherein the inner ring is secured around the reduced diameter shaft portion while applying a suitable amount of pre-load on the upper end surface of the inner ring, and the lower surface of the outer ring is urged onto the upper surface of the sleeve outer ring to contact intimately therewith, wherein the outer diameter of the sleeve outer ring is larger than the outer diameter of the outer ring of the ball bearing, and wherein the upper end surface of the sleeve outer ring extending outwardly from the outer boundary of the outer ring is employed as a supporting portion for the swing arm.

In the pivot bearing of the present invention, the end surface of the outer ring of the ball bearing and the corresponding opposite end surface of the sleeve outer ring are ground with high precision on their flatness and perpendicularity so as not to produce wave-shaped deformations thereon, and thus obtained parts can be assembled so as to contact intimately with each other.

In the pivot bearing of the present invention, the swing arm mounted on the supporting portion is a single arm.

In the pivot bearing of the present invention, the end surface of the outer ring of the ball bearing and the corresponding opposite end surface of the sleeve outer ring are ground with high precision on their flatness and perpendicularity so as not to produce wave-shaped deformations thereon, and thus obtained parts can be assembled so as to contact intimately with each other.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE PRESENT INVENTION

An embodiment of a swing arm assembly in accordance with the present invention will now be described on the basis of the illustrative example illustrated in the attached drawings.

Figure 1:
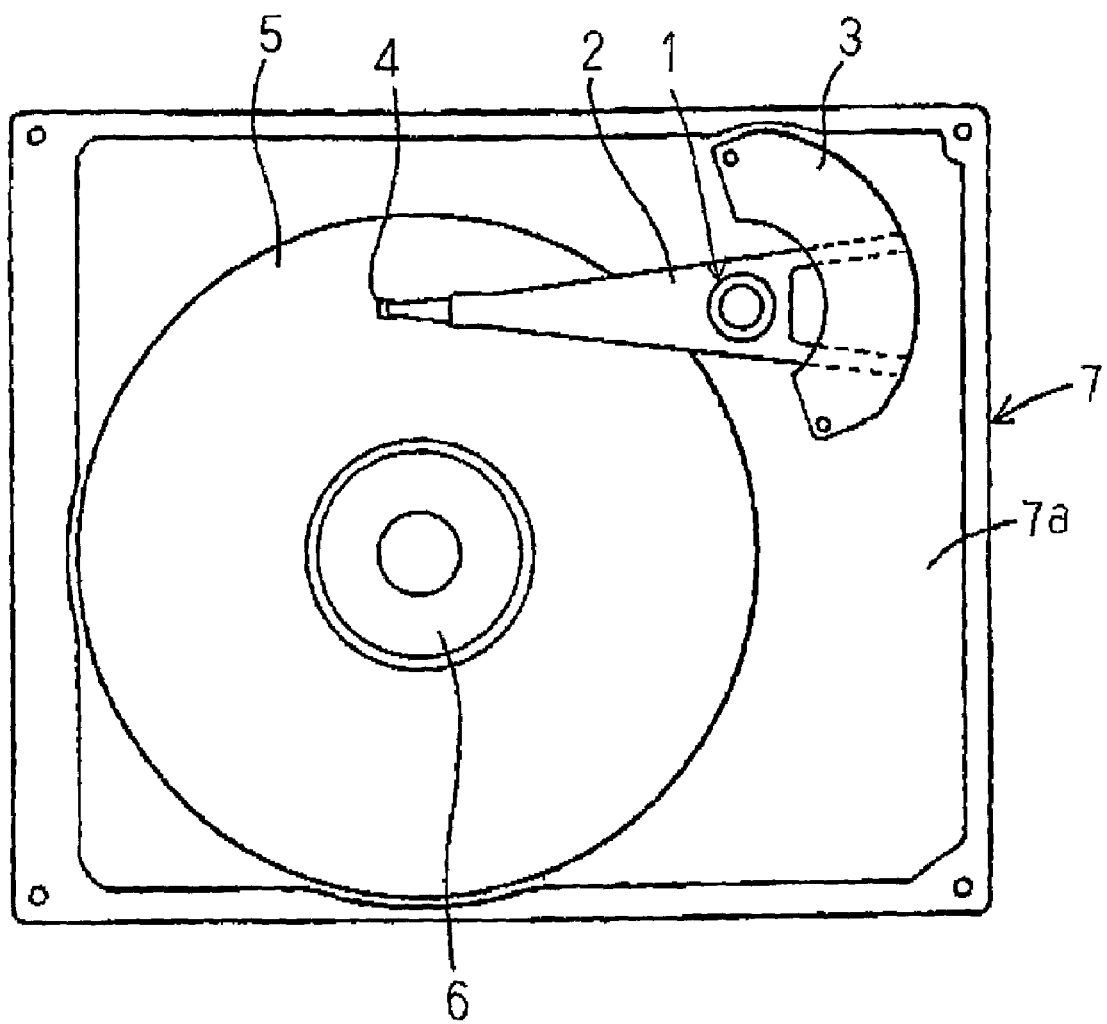
FIG. 1 is a plan view showing the internal structure of a hard disk drive device in which a swing arm is swingably supported through a bearing of the present invention.

The internal structure of a hard disk drive device is illustrated in FIG. 1, in which a swing arm 2 is supported through a pivot bearing 1 of the present invention.

The swing arm is adapted to be swung by means of a driving device 3 to any arbitrary position. A magnetic head 4 can thus be swung radially relative to a magnetic disk 5 through the swing motion of the swing arm.

The magnetic disk 5 is mounted around a motor hub 6 adapted to be driven rotationally by means of a motor (not shown). The element designated by the reference numeral 7 is a casing of the hard disk drive device.

Figure 2:
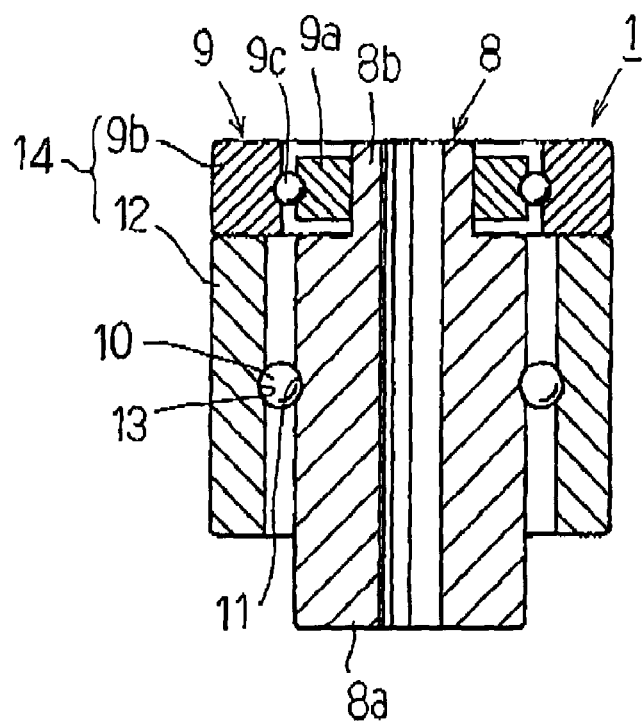
FIG. 2 is a vertical cross sectional elevational view showing a pivot bearing of a first embodiment of the present invention.

The pivot bearing 1 in accordance with the first embodiment includes a hollow stepped shaft 8 including an enlarged diameter shaft portion 8a and a reduced diameter shaft portion 8b as shown in FIG. 2. A ball bearing 9 including inner and outer rings 9a and 9b and a plurality of balls 9c interposed therebetween is mounted around the reduced diameter shaft portion 8b so that the inner ring 9a is fit around the reduced diameter shaft portion 8b. The enlarged diameter shaft portion 8a is provided directly around the outer periphery thereof with an inner ring raceway 11 for balls 10 of the lower row. A sleeve outer ring 12 surrounding the enlarged diameter shaft portion is provided directly around the inner periphery thereof with an outer ring raceway 13. The balls 10 of the lower row are adapted to be interposed between the inner and outer ring raceways 11 and 13.

The outer ring 9b of the ball bearing 9 and the Sleeve Outer ring 12 are in intimate contact with each other at their opposite surfaces to form an outer ring member 14. In the structure of the bearing of the first embodiment, the outer periphery of the outer ring member 14 is straight, i.e. the outer diameter of the outer ring 9b of the ball bearing is the same as the outer diameter of the sleeve outer ring 12. Thus the outer peripheral surface of the outer ring member 14 serves directly as a mount for the swing arm 2.

The end surface of the outer ring 9b of the ball bearing and the corresponding opposite end surface of the sleeve outer ring 12 are ground with high precision on their flatness and perpendicularity so as not to produce wave-shaped deformations thereon. Thus obtained parts can be assembled to contact intimately with each other.

In the pivot bearing 1 of the above-described structure, before being incorporated into the hard disk drive device, the inner ring 9a of the ball bearing 9 is secured around the reduced diameter shaft portion 8b by any means such as adhesion while applying an appropriate amount of pre-load on the upper end surface thereof. The completed pivot bearing can thus be obtained.

Figure 3:
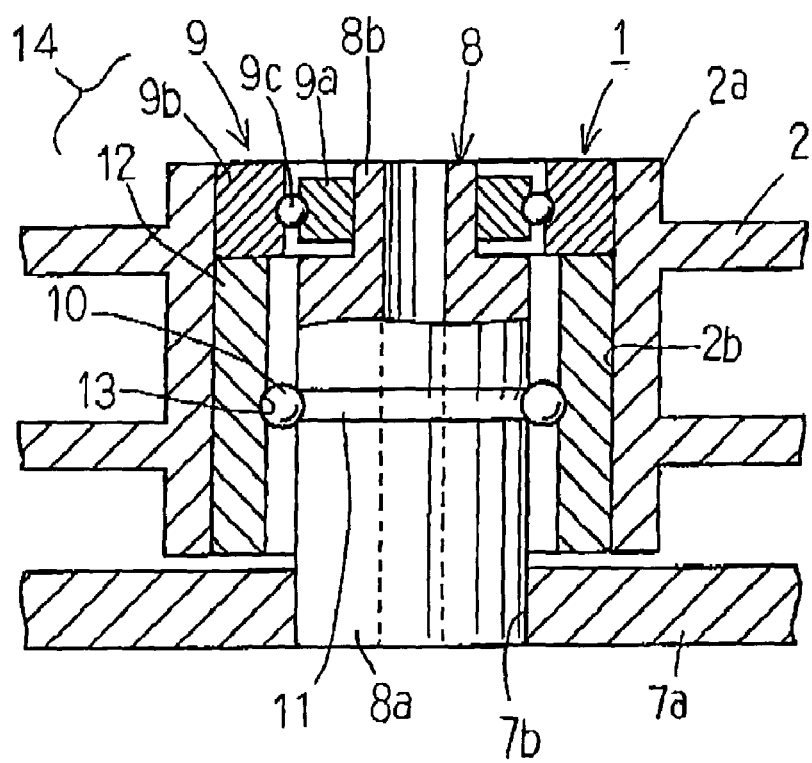
FIG. 3 is a vertical cross sectional elevational view showing the pivot bearing of FIG. 2 and the swing arm mounted thereto.

The swing arm 2 is provided on its base with a cylindrical fitting portion 2a including a vertical through hole 2b. The through hole 2b of the swing arm 2 is fit around the outer periphery of the outer ring member 14 and secured thereto by any means such as adhesion as shown in FIG. 3. Thus a swing arm assembly including the pivot bearing 1 and the swing arm assembled therewith can be provided. The swing arm assembly may be incorporated into the hard disk drive device by inserting the base (lower end portion) of the enlarged diameter shaft portion 8a of the stepped shaft 8 of the pivot bearing 1 into an aperture 7b formed through the casing base, and secured thereto.

Figure 4:
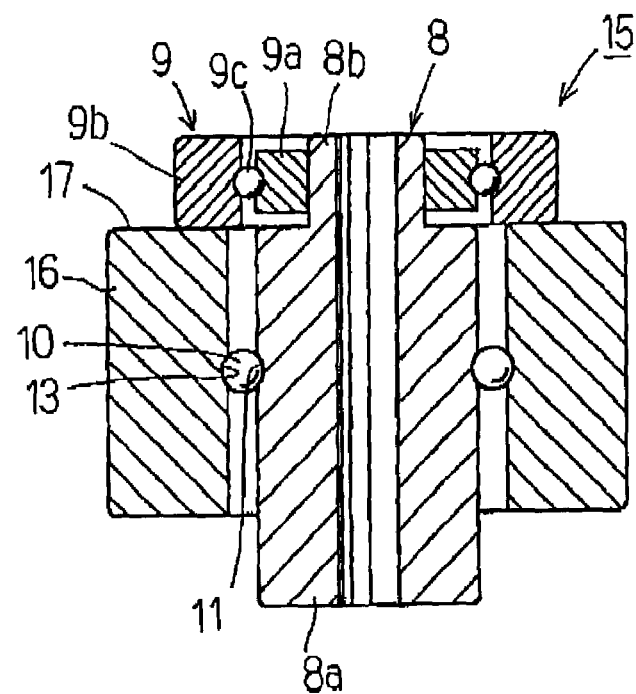
FIG. 4 is a vertical cross sectional elevational view showing the pivot bearing of a second embodiment of the present invention.
Figure 5:
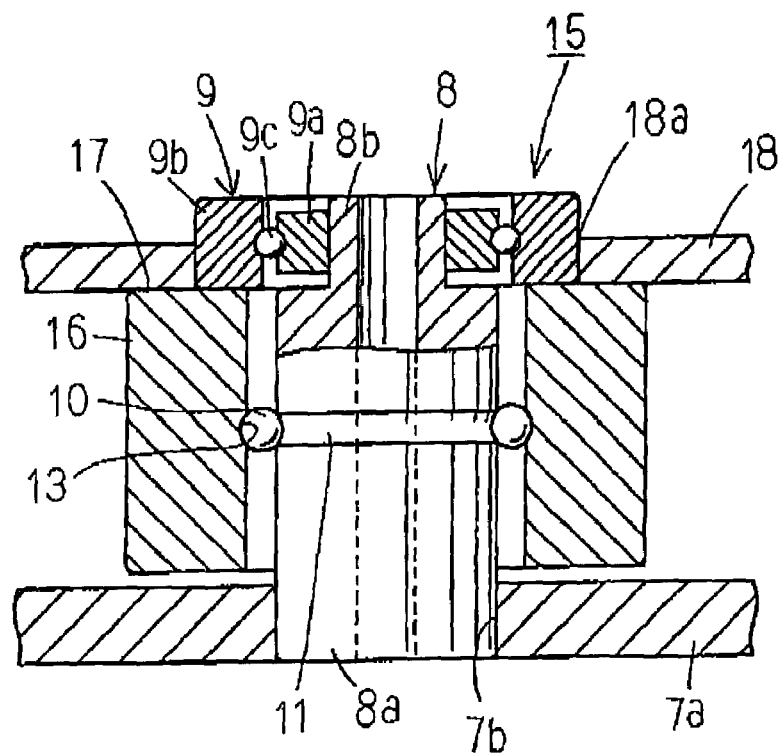
FIG. 5 is a vertical cross sectional elevational view showing the pivot bearing of FIG. 4 and the swing arm mounted thereto.
Figure 6:
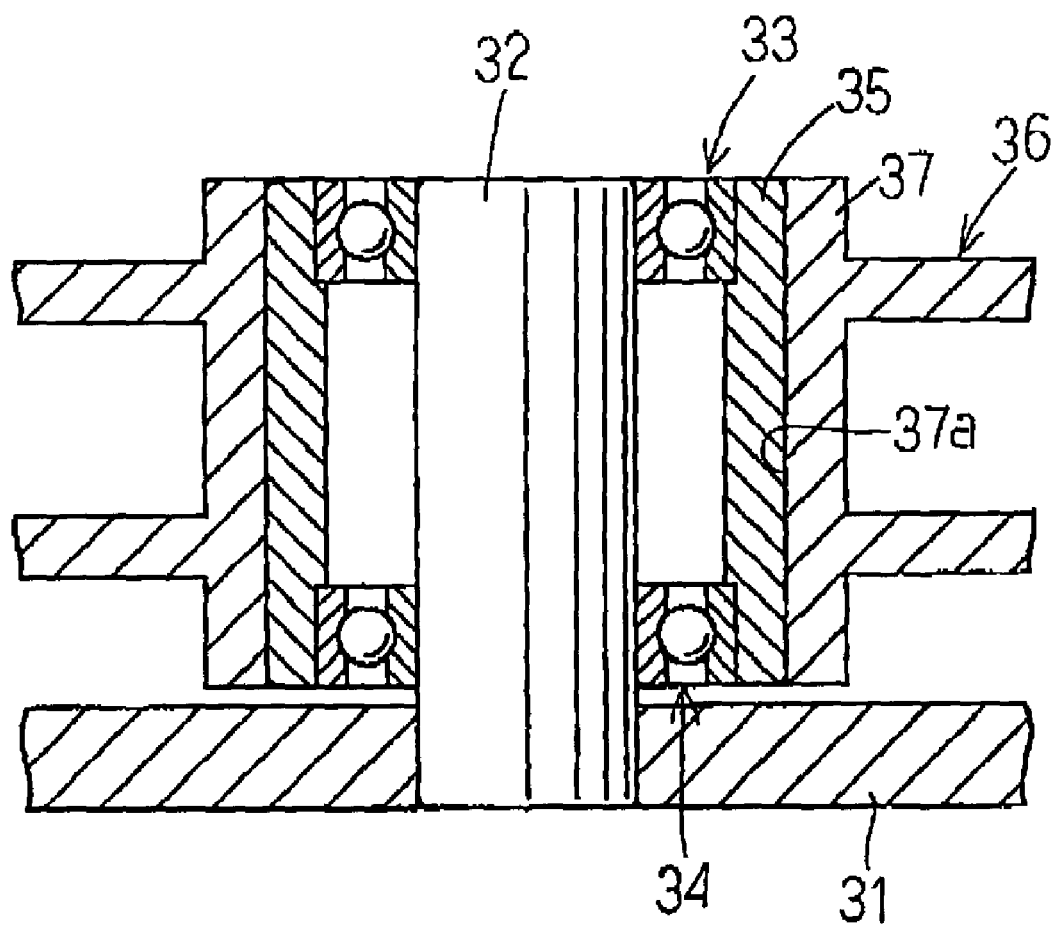
FIG. 6 is a vertical cross sectional elevational view showing a bearing of the prior art and a swing arm journalled thereby.

The above-mentioned pivot bearing 1 is designed for the swing arm including a plurality of (e. g. two in the embodiment as shown in FIGS. 2 and 3) arms. The pivot bearing of the second embodiment designed for the swing arm including an arm will now be described with reference to FIGS. 4 and 5.

The swing arm including one arm is referred to as a single arm. The single arm may be employed for the hard disk drive device including magnetic disk 5, which is provided on one or both surfaces thereof with a track or tracks for storing magnetic data.

A pivot bearing 15 of the above mentioned second embodiment is different from the first embodiment in the structure of the outer ring member.

The outer ring member 14 of the first embodiment includes an outer peripheral surface of generally straight configuration. This is because the outer diameter of the sleeve outer ring 12 is the same as the outer diameter of the outer ring 9b of the ball bearing 9. Whereas, in the case of the pivot bearing of the second embodiment, the outer diameter of the sleeve outer ring 16 is larger than the outer diameter of the outer ring 9b of the ball bearing, and the upper end portion of a sleeve outer ring 16 extending radially outwardly from the outer boundary of the outer ring 9b is a supporting portion 17 employed for supporting the swing arm.

The structure of the pivot bearing of the second embodiment is substantially the same that of the first embodiment other than the sleeve outer ring 16.

As with the pivot bearing 1 of the first embodiment, the pivot bearing 15 of the second embodiment of the structure as mentioned above, before being incorporated into the hard disk drive device, the inner ring 9a of the ball bearing 9 is secured around the reduced diameter shaft portion 8b by any means such as adhesion while applying a suitable amount of pre-load on the upper end surface thereof. The completed pivot bearing can thus be obtained.

A swing arm 18 is provided on its base with a fitting aperture 18a adapted to be fit around the outer periphery of the outer ring 9b of the ball bearing 9. The end surface of the swing arm around the fitting aperture 18a is abutted and secured onto the supporting portion 17 by any means such as adhesion. Thus a swing arm assembly including the pivot bearing 15 and the swing arm assembled therewith can be provided. The swing arm assembly may be incorporated into the hard disk drive device by inserting the base (lower end portion) of the enlarged diameter shaft portion 8a of the stepped shaft 8 of the pivot bearing 15 into the aperture 7b formed through the casing base, and secured thereto.

In the pivot bearing of the present invention, the swing arm is mounted directly on the outer periphery of the outer ring member, so that it is not necessary to interpose the bearing holder between the outer ring member and the swing arm as required in the prior art. In this connection, the number of parts can be reduced relative to the prior art, and the adverse effects due to the accuracy of the size of the bearing holder can be eliminated to improve the accuracy of rotation.

Before incorporation into the swing arm, the predetermined correct amount of pre-load can be applied onto the inner ring of the ball bearing of the pivot bearing of the present invention from the upper end surface thereof, so that it is unnecessary to set the pre-load on the pivot bearing upon incorporating the swing arm or the hard disk drive device. Thus the number of processes required for assembling the hard disk drive device can be reduced and control of accuracy can be effected easily.

In the pivot bearing of the present invention, the shaft is a stepped shaft including the enlarged diameter shaft portion, so that the bearing itself is high in its rigidity, balls of larger diameter can be used, and the shock resistance and strength thereof can also be improved as a whole.

In this connection, the cost for manufacturing the hard disk drive device can be further reduced without affecting the swing accuracy of the swing arm.

Especially where the swing arm is a single arm, the pivot bearing includes a sleeve outer ring which is larger in its diameter than the outer ring of the ball bearing. The swing arm is adapted to be fit around the outer periphery of the outer ring of the ball bearing. The lower surface of the swing arm around the fitting aperture is abutted and secured onto the supporting portion by any means such as adhesion, using an adhesive for example. Thus a cylindrical fitting portion provided on the base of the swing arm is not necessary, and the swing arm may be supported stably on the supporting portion. Assembly of the swing arm can be performed easily, and further reduction of the cost can be expected in the swing arm of single arm type.

While particular embodiments of the present invention have been illustrated and described, it should be obvious to those skilled in the art that various changes and modifications can be made without departing from the spirit and scope of the invention.

What is claimed is:

1. A pivot bearing for a swing arm of a hard disk drive device comprising:
   a stepped shaft including an enlarged diameter shaft portion and a reduced diameter shaft portion, wherein an inner ring raceway is provided directly around an outer periphery of the enlarged diameter shaft portion for a lower row of balls;
   a sleeve outer ring surrounding the enlarged diameter shaft portion of the stepped shaft, wherein an outer ring raceway is provided directly around the inner periphery of the sleeve outer ring;
   a plurality of balls of the lower row adapted to be interposed between the inner and outer ring raceways; and
   a ball bearing including inner and outer rings and a plurality of balls interposed therebetween, wherein the inner ring of the ball bearing is secured around the reduced diameter shaft portion while applying an appropriate amount of pre-load on an upper end surface of the inner ring, and a lower surface of the outer ring is urged onto an upper surface of the sleeve outer ring so as to contact intimately therewith.

2. The pivot bearing for a swing arm of a hard disk drive device as claimed in claim 1, wherein an end surface of the outer ring of said ball bearing and a corresponding opposite end surface of the sleeve outer ring are ground with precision on their flatness and perpendicularity so as not to produce wave-shaped deformations thereon, and thus obtained parts can be assembled so as to contact intimately with each other.

3. A pivot bearing for a swing arm of a hard disk drive device comprising:
- a stepped shaft including an enlarged diameter shaft portion and a reduced diameter shaft portion, wherein an inner ring raceway is provided directly around an outer periphery of the enlarged diameter shaft portion for a lower row of balls;
- a sleeve outer ring surrounding the enlarged diameter shaft portion of the stepped shaft, wherein an outer ring raceway is provided directly around the inner periphery of the sleeve outer ring;
- a plurality of balls of the lower row adapted to be interposed between the inner and outer ring raceways; and
- a ball bearing including inner and outer rings and a plurality of balls interposed therebetween, wherein the inner ring of the ball bearing is secured around the reduced diameter shaft portion while applying an appropriate amount of pre-load on an upper end surface of the inner ring, and a lower surface of the outer ring is urged onto an upper surface of the sleeve outer ring so as to contact intimately therewith,
- wherein an outer diameter of said sleeve outer ring is larger than an outer diameter of the outer ring of said ball bearing, and wherein an upper end surface of the sleeve outer ring extending outwardly from the outer boundary of the outer ring is employed as a supporting portion for the swing arm, said swing arm mounted on said supporting portion.

4. The pivot bearing for a swing arm of a hard disk drive device as claimed in claim 3, wherein an end surface of the outer ring of said ball bearing and a corresponding opposite end surface of the sleeve outer ring are ground with precision on their flatness and perpendicularity so as not to produce wave-shaped deformations thereon, and thus obtained parts can be assembled so as to contact intimately with each other.

5. The pivot bearing for the swing arm of the hard disk drive device as claimed in claim 3, wherein the swing arm mounted on said supporting portion comprises a single arm.

6. The pivot bearing for a swing arm of a hard disk drive device as claimed in claim 5, wherein an end surface of the outer ring of said ball bearing and a corresponding opposite end surface of the sleeve outer ring are ground with precision on their flatness and perpendicularity so as not to produce wave-shaped deformations thereon, and thus obtained parts can be assembled so as to contact intimately with each other.

* * * * *